(12) United States Patent
Aoyagi et al.

(10) Patent No.: US 6,831,726 B2
(45) Date of Patent: Dec. 14, 2004

(54) LIQUID CRYSTAL DISPLAY AND FABRICATION METHOD THEREOF

(75) Inventors: Yoshinori Aoyagi, Kagoshima (JP); Yuji Tanaka, Kagoshima (JP); Hironori Shiba, Kagoshima (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/839,296

(22) Filed: Apr. 23, 2001

(65) Prior Publication Data

US 2001/0038435 A1 Nov. 8, 2001

(30) Foreign Application Priority Data

Apr. 24, 2000 (JP) ........................................ 2000-122638

(51) Int. Cl.[7] ..................... G02F 1/1333; G02F 1/1339; G02F 1/1343; G02F 1/1335; G02F 1/136
(52) U.S. Cl. ....................... 349/158; 349/156; 349/141; 349/43; 349/106
(58) Field of Search ............................... 349/158, 156, 349/141, 43, 106, 132

(56) References Cited

U.S. PATENT DOCUMENTS 6,016,180 A * 1/2000 Bradshaw et al. .......... 349/156
6,295,110 B1 * 9/2001 Ohe et al. ................... 349/124

FOREIGN PATENT DOCUMENTS

JP         5-264983         10/1993

OTHER PUBLICATIONS

Japanese Office Action dated Jan. 7, 2003 with partial English Translation.

* cited by examiner

Primary Examiner—Robert H. Kim
Assistant Examiner—Hoan C. Nguyen
(74) Attorney, Agent, or Firm—McGinn & Gibb PLLC

(57) ABSTRACT

In a liquid crystal display panel, by adhering the TFT substrate 1 to the color filter (CF) substrate 2 such that the repeating direction of thickness distribution or irregularity distribution of the TFT substrate 1 becomes orthogonal to the repeating direction of thickness distribution or irregularity distribution of the CF substrate 2, a distance between a point at which the thick portion of the TFT substrate 1 overlaps on the thick portion of the CF substrate 2 and a point at which the thin portion of the TFT substrate 1 and the thin portion of the CF substrate 2 are overlapped becomes larger than that in a case where the substrates are adhered each other with the repeating directions thereof being trued up. Therefore, the factor defective of the liquid crystal display panel caused by the overlapping of the thick portions and the overlapping of the thin portions of the substrates, that is, the factor defective of the liquid crystal display panel caused by variation of display, can be reduced.

16 Claims, 6 Drawing Sheets

FIG. 4A
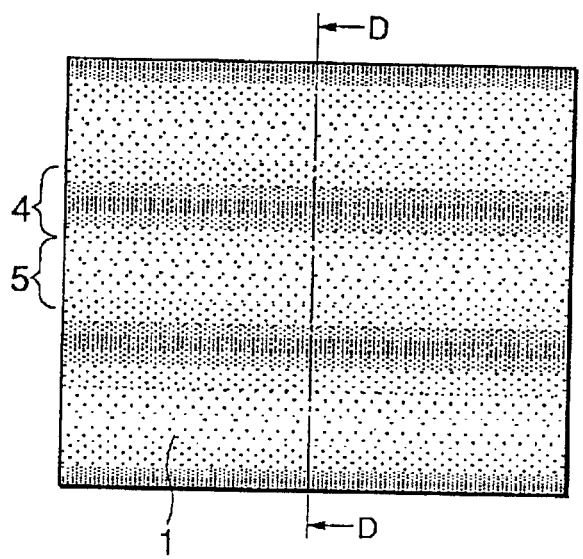
FIG. 4B
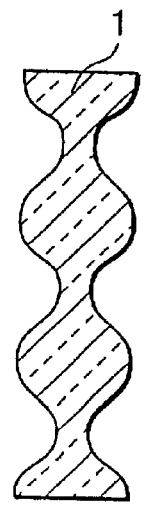
FIG. 5A
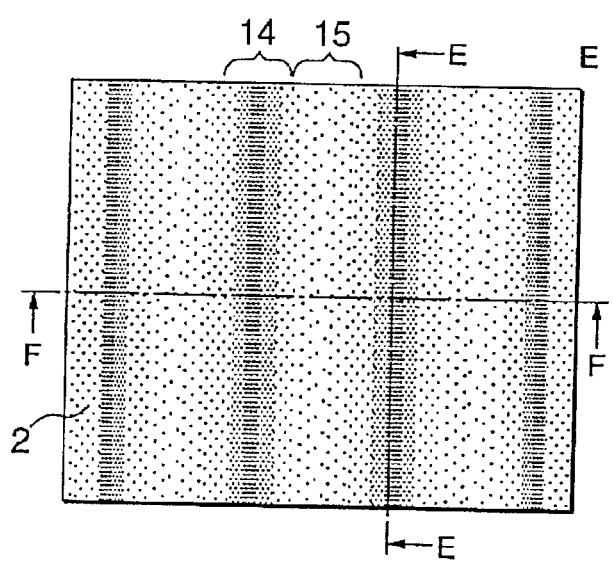
FIG. 5B
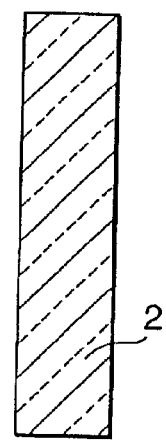
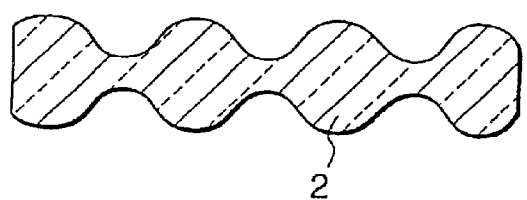
FIG. 5C

LIQUID CRYSTAL DISPLAY AND FABRICATION METHOD THEREOF

BACKGROUND OF THE INVENTION

1. Field of the Invention

The present invention relates to a liquid crystal display and, particularly, to a liquid crystal display panel of the In-Plane Switching (IPS) system and a fabrication method of the same liquid crystal display panel.

2. Description of the Prior Art

With the increased demand of liquid crystal display, the demand of reduction of fabrication cost of the liquid crystal display panel is also requested. In order to reduce the fabrication cost of a pair of glass substrates used in the liquid crystal display panel, it is usual to fabricate a large size strip-shaped glass substrate and a plurality of liquid crystal display panels are cut apart from the large size strip-shaped glass substrate.

Since the liquid crystal display panel is usually rectangular, the cutting direction of the large size strip-shaped glass substrate (referred to as "raw glass substrate", hereinafter) with which the largest number of glass substrates for liquid crystal panel can be cut apart from the raw glass substrate is primarily determined by the size of the raw glass substrate. For example, it is possible to cut apart six panel substrates each for a 14.1 inches liquid crystal display panel from a 600 mm×720 mm raw glass substrate. That is, by cutting the raw glass substrate along a shorter side thereof such that longer sides of the respective panel substrates become in parallel, two columns each including three panel substrates can be cut out from the raw glass substrate.

Since the respective raw glass substrates are continuously fabricated as long glass belts having a predetermined width, it is unavoidable that the surface condition and/or thickness of the raw glass substrate has the direction dependency in a width direction and a lengthwise direction thereof the raw glass substrate. Particularly, since a surface of a raw glass substrate fabricated by the slot downdraw process becomes in contact with a slit of a fabrication device, fine line-shaped irregularity extending along a lengthwise direction tends to occur in the surface thereof. Therefore, when the raw glass substrate is to be used for substrates of the liquid crystal display panel, the surface of the raw glass substrate has to be polished to remove the irregularity. However, it is difficult to remove the direction dependency of thickness throughout the whole raw glass substrate even if the fine irregularity can be removed by polishing.

On the other hand, although such fine line-shaped irregularity hardly occurs in a surface of a raw glass substrate fabricated by the fusion process, the latter process is the continuous fabrication method and, therefore, the thickness of the raw glass substrate varies in a direction perpendicular to a pulling direction thereof. Consequently, the direction dependency of the surface condition and the thickness of the raw glass substrate is unavoidable.

Therefore, when a liquid crystal display panel is to be constructed by arranging a TFT (Thin Film Transistor) substrate constructed by forming pixel electrodes and switching elements such as TFT's on one of the rectangular substrates cut apart from the continuously fabricated raw glass substrate and a CF (Color Filter) substrate constructed by forming a color filter (CF) on another of the rectangular substrates in an opposing relation through a liquid crystal layer, spacer members and a sealing member, the direction dependencies of the opposing glass substrates are in the same direction.

When a longer side direction of a TFT substrate 21 is the same as a drawing direction of the raw glass substrate during a fabrication of the raw glass substrate as shown in, for example, in FIG. 1A, there is the direction dependency of thickness of the TFT substrate 21 in the shorter side direction thereof as exaggeratedly shown by a cross section thereof in FIG. 1B. Since the shorter side direction of a CF substrate 22 is the same as the drawing direction of the raw glass substrate similarly as shown in FIG. 2A, there is the direction dependency of thickness of the CF substrate 22 in the shorter side direction thereof as exaggeratedly shown by a cross section thereof in FIG. 2B.

Therefore, when the liquid crystal display panel 23 is constructed by arranging the pair of such rectangular glass substrates in the opposing relation such that the longer sides thereof become in parallel, thicker portions 24 and 34 of the TFT and CF substrates may be substantially overlapped and thinner portions 25 and 35 thereof are also overlapped, as shown in FIG. 3A and FIG. 3B showing a cross section thereof. In such case, a distance 28 between an area 26 in which the thicker portions are overlapped and an area 27 in which the thinner portions are overlapped substantially becomes a half of a distance between adjacent areas of the overlapped thicker portions.

In such case, a larger pressure than a pressure applied to the overlapped thinner portions is applied to the overlapped thicker portions in the pressing step for adhering the TFT substrate to the CF substrate under pressure of the fabrication process of the liquid crystal display panel 23. That is, a difference in pressure between the area 26 and the area 27 is provided within the liquid crystal display panel 23. In the area in which the larger pressure is applied, the spacers and the CF layer may be deformed more. The deformation includes elastic deformation and plastic deformation. Although the elastic deformation is removed when the pressure thereto is removed, the plastic deformation cannot be removed even when the pressure is removed. Therefore, in a portion having large plastic deformation, that is, the area 26 in which the thicker portions are overlapped, a gap between the TFT substrate 21 and the CF substrate 22 becomes small and, in the area 27 in which the thinner portions are overlapped, the gap becomes large. In other words, the variation of the thickness of the substrate produces a variation of pressure and hence a variation of the gap between the TFT substrate and the CF substrate. Since light transmittance of liquid crystal depends upon the gap between the TFT substrate 21 and the CF substrate 22, the variation of gap causes a variation of display. As such, a small variation of the display cell gap is unavoidable throughout the panel.

In a conventional liquid crystal display panel employing TN (Twisted Nematic) mode liquid crystal utilizing rotary polarization, the influence of small variation of the display cell gap on the variation of light transmittance of liquid crystal is small. However, since a liquid crystal display panel using IPS mode or VA (Vertical Alignment) mode, which is a wide view angle mode, utilizes the birefringence effect of liquid crystal, the influence of the variation of cell gap on the light transmittance of liquid crystal is large compared with the conventional liquid crystal display panel employing TN mode. Further, although there is a tendency of reducing the cell gap in order for increase of response speed of display, the reduction of cell gap makes light transmittance of liquid crystal sensitive to the variation of gap.

Therefore, the variation of display caused by variation of cell gap, which caused no problem in the past, becomes a problem recently. That is, it has been requested to control the display cell gap of the liquid crystal display panel uniform.

SUMMARY OF THE INVENTION

An object of the present invention is to provide a substrate arranging structure of, for example, a liquid crystal display device, for reducing the irregularity of display, which is caused by thickness distribution or irregularity distribution of opposing substrates used in the liquid crystal display device, and a fabrication method of the substrate arranging structure.

The present invention is featured by that a direction of thickness distribution or irregularity distribution of a TFT substrate becomes orthogonal to a direction of thickness or irregularity of a CF substrate when the substrates are laid one on the other during a fabrication process of a liquid crystal display panel.

The liquid crystal display panel according to the present invention comprises the first substrate, the second substrate arranged in an opposing relation to the first substrate and liquid crystal disposed in a gap between the first and second substrates, wherein the first substrate has a distribution of thickness or irregularity variation in one direction and the second substrate has a distribution of thickness or irregularity variation in one direction substantially orthogonal to the direction of distribution of thickness or irregularity variation of the first substrate. In more detail, the TFT substrate and the CF substrate are arranged in the opposing relation such that the direction of irregularity of the TFT substrate becomes orthogonal to the direction of irregularity of the CF substrate.

The fabrication method of a liquid crystal display device, according to the present invention, is featured by that the first and second substrates are cut apart from a raw glass substrate having direction dependency such that the direction dependency of the first substrate becomes orthogonal to the direction dependency of the second substrate. That is, the fabrication method comprises the step of cutting apart first rectangular substrates from a first raw glass substrate having line-shaped irregularity such that longer sides of the first substrates become in parallel to a drawing direction of the first raw glass substrate, the step of cutting apart rectangular second substrates from a second raw glass substrate having line-shaped irregularity such that long sides of the second substrates become orthogonal to a drawing direction of the second raw glass substrate and the step of arranging the first and second substrates in an opposing relation with the long sides of the first and second substrates become in the same direction, while maintaining a gap necessary to receive a liquid crystal layer therebetween.

When the first substrate is a TFT substrate having thin film transistors, the second substrate is a CF substrate having a color filter and it is preferable to construct a liquid crystal display panel of IPS system.

BRIEF DESCRIPTION OF THE DRAWINGS

FIG. 4A is a plan view of a TFT substrate constituting a liquid crystal display panel according to the present invention, showing exaggeratedly a case where a longer side direction of the TFT substrate is coincident with a drawing direction of a raw glass substrate;

FIG. 4B is a cross section taken along a line D—D in FIG. 4A;

FIG. 5A is a plan view of a CF substrate constituting the present liquid crystal display panel, showing exaggeratedly a case where a longer side direction of the CF substrate is orthogonal to the drawing direction of the raw glass substrate;

FIG. 5B is a cross section taken along a line E—E in FIG. 5A;

FIG. 5C is a cross section taken along a line F—F in FIG. 5A;

DETAILED DESCRIPTION OF THE PREFERRED EMBODIMENTS

Figure 1A:
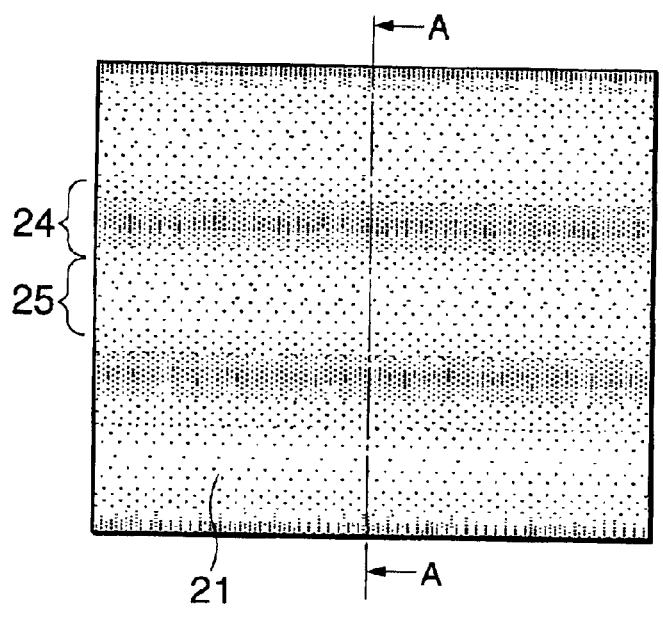
FIG. 1A is a plan view of a TFT substrate constituting a conventional liquid crystal display panel, showing exaggeratedly a case where a longer side direction of the TFT substrate is coincident with a drawing direction of a raw glass substrate.
Figure 1B:
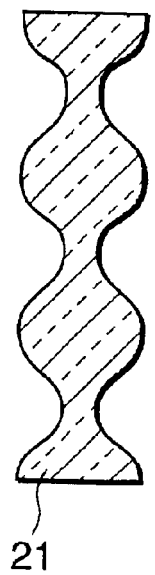
FIG. 1B is a cross section taken along a line A—A in FIG. 1A.
Figure 2A:
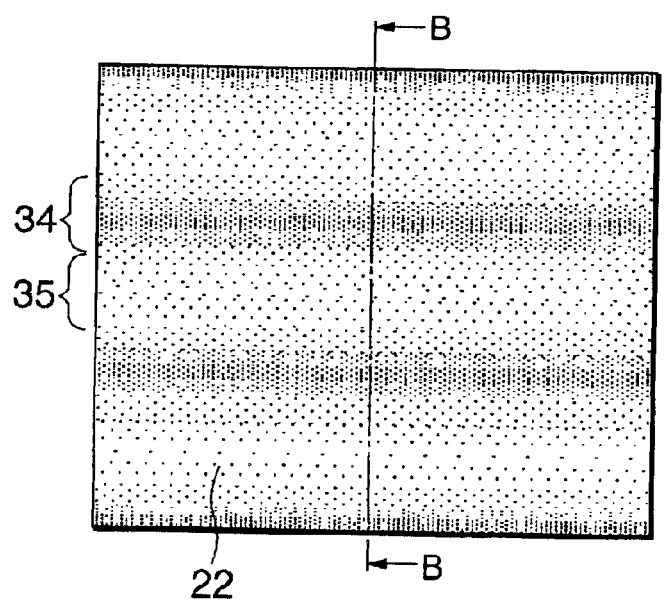
FIG. 2A is a plan view of a CF substrate constituting the conventional liquid crystal display panel, showing exaggeratedly a case where a longer side direction of the CF substrate is coincident with the drawing direction of the raw glass substrate.
Figure 2B:
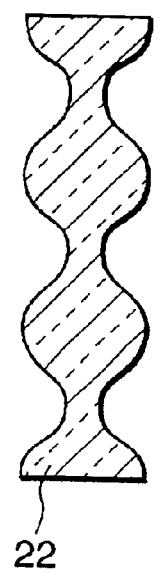
FIG. 2B is a cross section taken along a line B—B in FIG. 2A.

Referring to FIG. 4A and FIG. 4B, a rectangular TFT substrate 1 used in the present invention is cut apart from a raw glass substrate such that a longer side direction of the TFT substrate is coincident with a drawing direction of the raw glass substrate. On the other hand, a rectangular CF substrate 2 used in the present invention is cut apart from the raw glass substrate such that a longer side direction of the CF substrate is orthogonal to the drawing direction of the raw glass substrate.

Therefore, in a liquid crystal display panel including the TFT substrate 1 and the CF substrate 2 arranged in an opposing relation to the TFT substrate 1, directions of thickness distributions of the TFT substrate 1 and the CF substrate 2, which are caused by the fabrication of the raw glass substrate, are orthogonal each other.

In more detail, a plurality of line-shaped thick portions 4 and a plurality of line-shaped thin portions 5 such as shown in FIG'S. 4A and 4B extend along the longer side direction of the TFT substrate 1. The thick portions 4 and the thin portions 5 exist alternately, resulting in a thickness distribution along the shorter side direction of the TFT substrate 1 as shown in FIG. 4B. In FIG. 4B, the thickness distribution is shown in an exaggerated state. Such thickness distribution of the glass substrate is unavoidable when the raw glass substrate is fabricated by a continuous fabrication machine utilizing the fusion method or the slot downdraw method, etc., and the thickness distribution has the direction dependency in the drawing direction of the raw glass substrate. That is, the thick portions and the thin portions are adjacent each other and extend along the drawing direction as lines.

In the present invention, the liquid crystal display panel 3 is constructed by adhering the TFT substrate 1 to the CF substrate 2 by a sealing material 12 such that the thickness distribution direction of the TFT substrate 1 becomes orthogonal to the thickness distribution direction of the CF substrate 2, that is, the longer sides of the respective substrates are trued up, as shown in FIG'S. 6A and 6B.

Figure 3A:
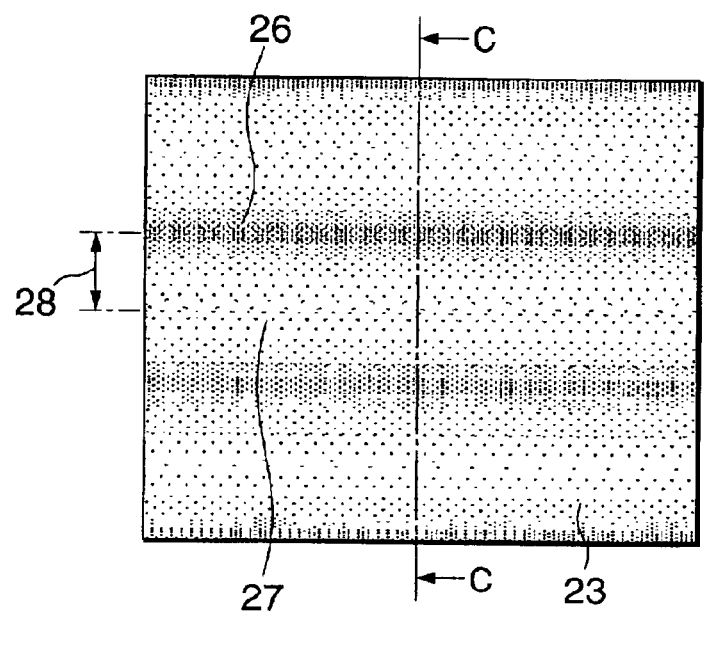
FIG. 3A is a plan view of the TFT substrate shown in, FIG'S. 1A and 1B and the CF substrate shown in FIG'S. 2A and 2B and put on the TFT substrate.
Figure 3B:
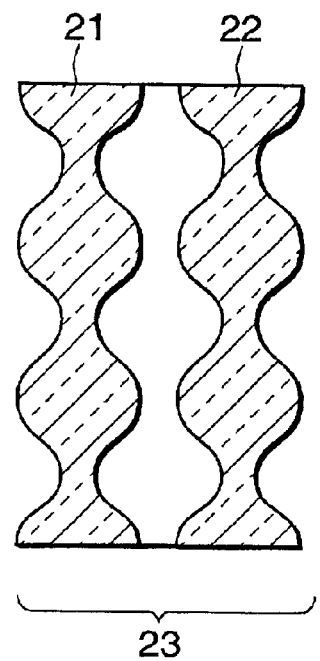
FIG. 3B is a cross section taken along a line C—C in FIG. 3A.
Figure 6A:
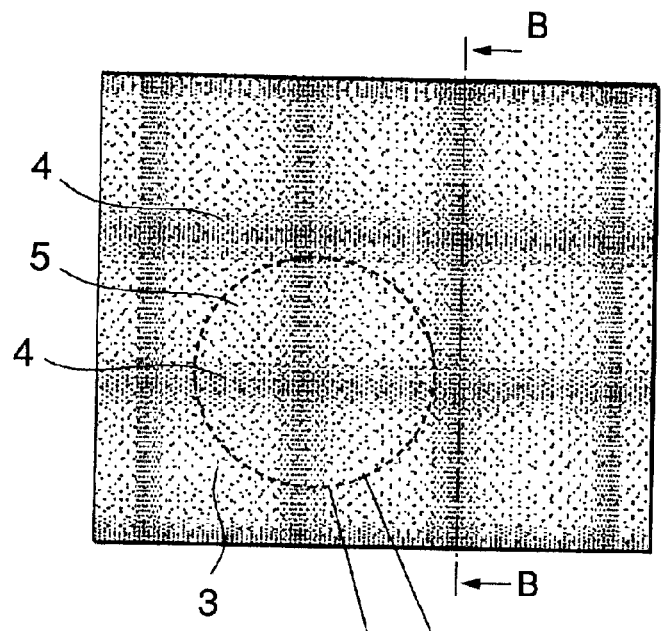
FIG. 6A is a plan view of the TFT substrate shown in FIG'S. 4A and 4B and the CF substrate shown in FIG'S. 5A and 5B and put on the TFT substrate.
Figure 6B:
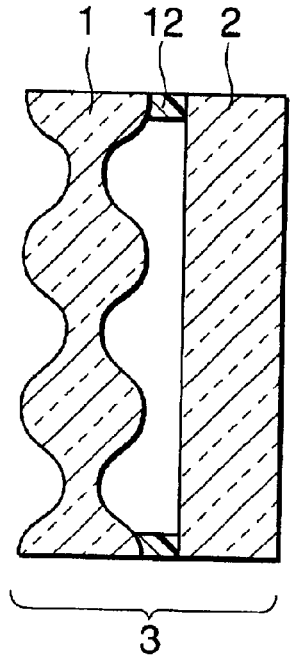
FIG. 6B is a cross section taken along a line G—G in FIG. 6A.
Figure 6C:
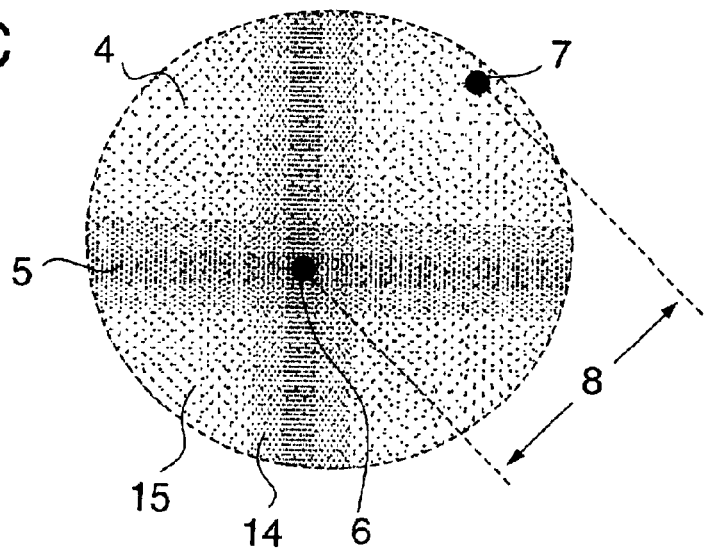
FIG. 6C is an enlarged plan view showing a portion shown in FIG. 6A.

As shown in FIG. 6C which is an enlarged plan view of an area surrounded by a dotted circular line in FIG. 6A, a distance 8 between a point 6 at which the thick portion 4 of the TFT substrate 1 overlaps on the thick portion 14 of the CF substrate 2 and a point 7 at which the thin portion 5 of the TFT substrate 1 and the thin portion 15 of the CF substrate 2 are overlapped becomes larger than that of the conventional liquid crystal display panel according to this construction of the liquid crystal display panel 3. That is, the distance 8 in the present invention becomes about 1.4 times ($\sqrt{2}$ times) a conventional distance 28 shown in FIG. 3A.

Therefore, since, although the pressure difference applied to the liquid crystal display panel 3 in the pressurizing step of the liquid crystal display panel fabrication process is the same as the pressure difference in fabricating the conventional panel, the distance between the point at which the thick portion 4 of the TFT substrate 1 overlaps on the thick portion 14 of the CF substrate 2 and the point at which the thin portion 5 of the TFT substrate 1 and the thin portion 15 of the CF substrate 2 are overlapped is larger than that in the conventional panel, a distance between positions at which the pressure differences are large becomes larger than that of the conventional panel.

Consequently, changing rate of variation of the gap between the substrates within the liquid crystal display panel 3 becomes small, so that the display irregularity caused by the gap variation is improved. This improving effect is remarkable in the liquid crystal display panel employing the IPS system as the liquid crystal display device.

The liquid crystal display device includes a passive matrix display employing STN (Super Twisted Nematic) liquid crystal and having no such active element and an active matrix display having such active elements as represented by TFT or MIM (Metal-Insulator-Metal) elements in respective pixels. The present invention will be described with reference to an active matrix display of the TFT type, although the presence or absence of active element does not make any problem provided that it is of the IPS system.

Figure 7A:
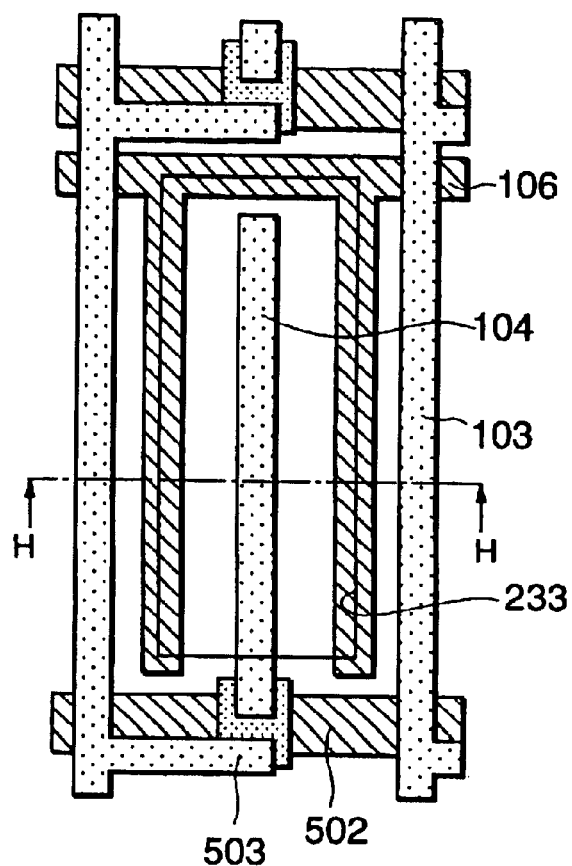
FIG. 7A is a schematic plan view showing an electrode pattern constituting one of pixels on the TFT substrate of the IPS system.
Figure 7B:
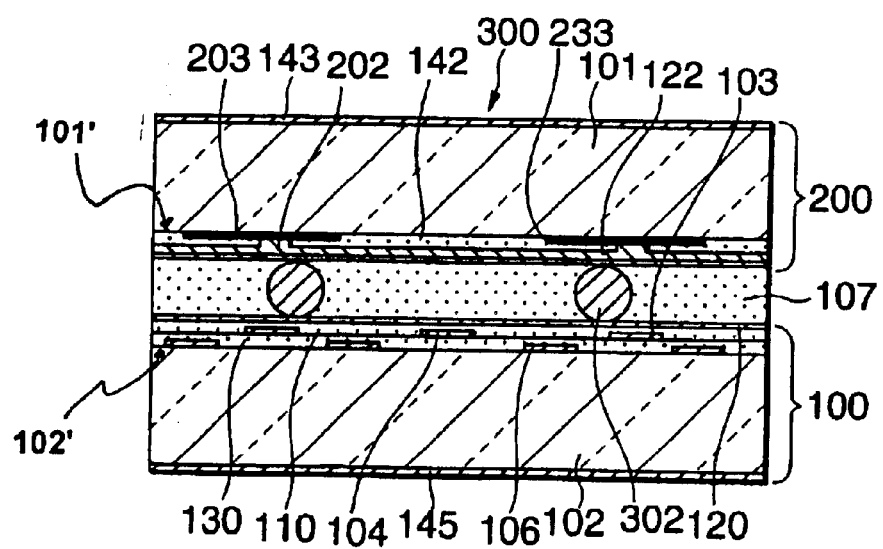
FIG. 7B is a cross section taken along a line H—H in FIG. 7A.

An example of an arrangement of electrodes constituting one of pixels on the TFT substrate of the IPS system is shown in FIG. 7A and FIG. 7B. Referring to FIG. 7A, the display pixel is constructed with a scan line 502, a signal line 103, a common electrode 106, a TFT 503 as a switching element and a pixel electrode 104, all of which are connected to external drive circuits. In FIG. 7B, which is a cross section taken along a line H—H in FIG. 7A, the common electrode 106 is formed on a glass substrate 102 (having a surface 102' which may include surface irregularities) on the TFT side and the pixel electrode 104 and the signal line 103 are formed above the common electrode 106 through a gate insulating film 130. The pixel electrode 104 and the common electrode 106 are arranged alternately. These electrodes are covered by a protective insulating film 110 and an alignment layer 120 on the TFT substrate, which is necessary for aligning molecules of liquid crystal 107, is formed on the protective insulating film 110 by painting and rubbed. The TFT substrate 100 is formed in this manner.

A matrix shaped light shield film 203 having opening areas 233 is provided on an opposing glass substrate 101 (having a surface 101' which may include surface irregularities), which becomes the CF substrate, and a color layer 142, which is necessary for color display, is formed on the light shield film 203. On the color layer 142, a leveling layer 202, which is necessary for flattening an upper surface of the opposing substrate, is provided and an alignment layer 122 on the opposing substrate side, which is necessary for aligning molecules of the liquid crystal 107, is formed on the leveling layer 202 by painting and rubbed. The rubbing direction is opposite to the rubbing direction of the alignment layer 120 on the TFT substrate 100. The CF substrate 200 is formed in this manner.

The liquid crystal 107 and spacers 302 are sealed in a gap between the TFT substrate 100 and the CF substrate 200. The gap between the TFT and CF substrates depends upon diameter of the spacer 302. Finally, a TFT-side polarizer 145 is stuck on a surface of the TFT substrate 102, on which an electrode pattern is not formed, by adhesive such that a transmission axis thereof becomes orthogonal to a rubbing direction and an opposing-side polarizer 143 is stuck on a surface of the opposing-side glass substrate 101, on which various patterns are not formed, such that a transmission axis thereof becomes orthogonal to the transmission axis of the TFT-side polarizer 145. The liquid crystal display panel 300 is completed in this manner.

The TFT substrate of each liquid crystal display panel may be fabricated by cutting apart a TFT substrate from a raw glass substrate and forming pixel electrodes and TFT's on the TFT substrate. Alternatively, a plurality of TFT substrates may be fabricated simultaneously by forming pixel electrodes and TFT's on a plurality of TFT substrate areas of the raw glass substrate for TFT substrate and then cutting apart the TFT substrate areas from the raw glass substrate. Similarly, a CF substrate may be formed individually by cutting apart a CF substrate from the raw glass substrate or a plurality of CF substrates may be formed simultaneously by cutting apart the CF substrate areas formed on the raw glass substrate.

Figure 8A:
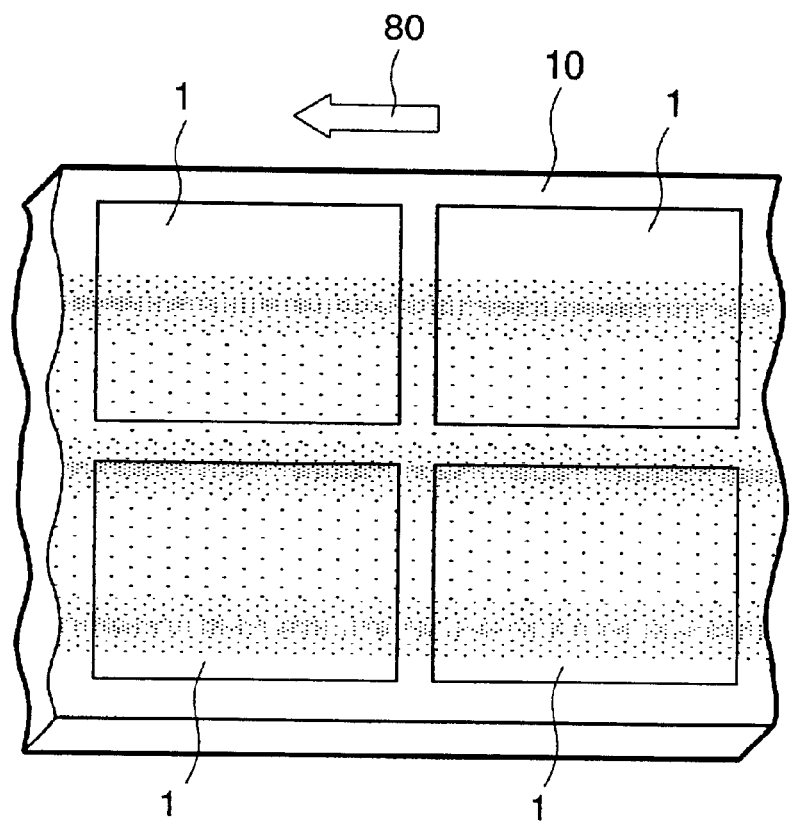
FIG. 8A is a schematic perspective view showing a case where four TFT substrates are cut apart from the raw glass substrate according to the present invention.
Figure 8B:
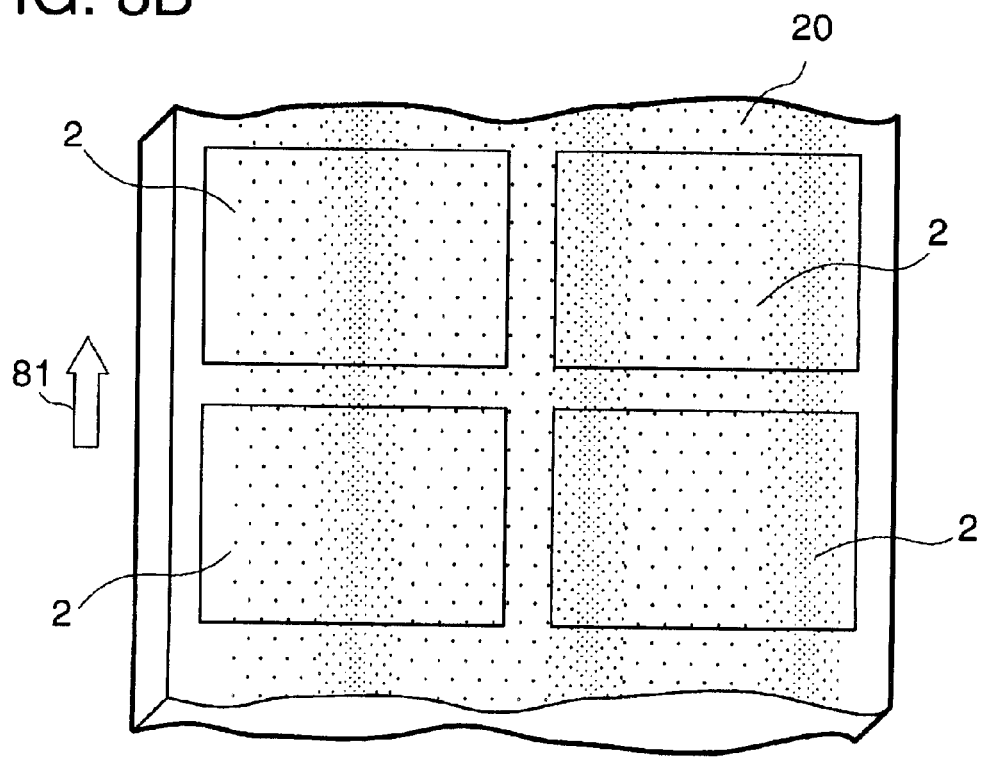
FIG. 8B is a schematic perspective view showing a case where four CF substrates are cut apart from the raw glass substrate according to the present invention.

An example of the case where a plurality (four) of TFT substrates are formed simultaneously and a plurality (four) of CF substrates are formed simultaneously will be described with reference to FIG. 8A and FIG. 8B. As shown in FIG. 8A, a raw glass substrate 10 for TFT substrate is drawn in a direction shown by an arrow 80. Areas for four TFT substrates 1 are determined such that the drawing direction of the raw substrate becomes coincident with longer sides of the TFT substrates 1. Before cutting the four TFT substrates 1, the alignment films are formed on the respective TFT substrate areas and rubbed and seal material is printed thereon. On the other hand, as shown in FIG. 8B, the raw glass substrate 20 for CF substrate is drawn in a direction shown by an arrow 81. Areas for four CF substrates 2 are determined such that the drawing direction of the raw substrate becomes coincident with shorter sides of the CF substrates 2. Size of the area of the CF substrate 2 is the same as that of the area of the TFT substrate 1. Before cutting the four CF substrates 2, the above mentioned alignment processing is performed in the areas of the CF substrates 2 and the spacers having spherical configuration or circular pillar configuration are dispersed uniformly on the whole areas of the CF substrates 2.

Thereafter, the raw glass substrate 10 for TFT substrate is put on the raw substrate 20 for CF substrate such that the alignment films of the TFT substrates and the CF substrates are opposing to each other and the seal material in the four areas is simultaneously hardened by heating or irradiating with ultraviolet ray the opposed substrates while applying a constant pressure therebetween. With this process, the TFT substrates 1 and the CF substrates 2 each having the same size as that of the TFT substrate are adhered to each other with the gaps between the TFT substrates and the CF substrates being kept at constant by the spacers, resulting in four sets of the mutually adhered TFT substrates and the CF substrates. Thereafter, the TFT substrate and CF substrate sets are cut apart to four panels. Thereafter, liquid crystal is injected into the gaps between the TFT substrates 1 and the CF substrates 2 through liquid crystal injection ports of the panels and the injection ports are closed by an adhesive. Four liquid crystal display panels 3 are completed simultaneously by sticking the polarizers on surfaces of the TFT substrate 1 and the CF substrate 2, which are opposite to the surfaces thereof on which the alignment films are provided.

Needless to say, the raw substrate 10 of the TFT substrates is stuck on and adhered to the raw substrate 20 for the CF substrates such that the repeating direction of the thickness distribution of the raw substrate 20 (including the thick portions 4 and the thin portions 5 as shown in FIG. 4A) becomes orthogonal to the repeating direction of the thickness distribution of the raw substrate 20. Furthermore, the cutting step of the panels may be performed before the raw substrates 10 and 20 are arranged in the opposing relation.

In the liquid crystal display panel according to the embodiment of the present invention and the conventional liquid crystal display panel described hereinbefore, each raw glass substrate having two thick portions and three thin portions is shown for simplicity of illustration. However, it is practical that the thickness distribution is repeated with random interval. The structure and the fabrication method of the present invention are also effective in such case, needless to say.

Furthermore, although the case where the longer side direction of the rectangular TFT substrate is made coincident with the drawing direction of the raw glass substrate for the TFT substrate and the shorter side direction of the CF substrate is made coincident with the drawing direction of the raw glass substrate for the CF substrate has been described, it is possible to make the shorter side direction of the TFT substrate coincident with the drawing direction of the raw glass substrate and the longer side direction of the CF substrate coincident with the drawing direction of the raw glass substrate. In order to economically cut apart the rectangular substrates from the raw glass substrate, it is preferable that the raw glass substrate for the TFT substrates is cut apart from a larger raw glass material dedicated thereto and the raw glass substrate for the CF substrates is cut apart from a dedicated larger raw glass substrate having different width and length with respect to the drawing direction thereof from those of the larger raw glass substrate for the TFT substrate. If wastefulness of glass material is allowable, it may be possible to fabricated the present liquid crystal display panel by cutting the TFT substrates and the CF substrates from the same raw glass substrate such that the longer side direction of the TFT substrates becomes orthogonal to the longer side direction of the CF substrate.

Although the case where the substrate includes thick portions and thin portions has been described, the present invention can be applied to substrates having constant thickness and having surfaces including corrugated deformation.

As described hereinbefore, according to the liquid crystal display device and the fabrication method thereof, it is possible, by adhering mutually opposing two substrates such that thickness directions thereof become orthogonal, to increase the distance between positions at which the thick portions of the TFT substrate and the CF substrate are overlapped and the thin portions of the TFT substrate and the CF substrate are overlapped and there is a difference in pressure therebetween when the TFT substrate and the CF substrate are adhered together under pressure, compared with the case where the substrates are adhered with the repeating directions of thickness distribution thereof being trued up, that is, in parallel mutually, to thereby reduce the fraction defective of the liquid crystal display panel due to overlapping of thick portions and overlapping of thin portions. Consequently, it is possible to reduce the variation of display.

What is claimed is:

1. A fabrication method of a liquid crystal display device, comprising:

cutting apart a first rectangular substrate from a first raw glass substrate having a surface irregularity such that a longer side direction of said first rectangular substrate is coincident with a drawing direction of said first raw glass substrate;

cutting apart a second rectangular substrate from a second raw glass substrate having a surface irregularity such that a longer side direction of said second rectangular substrate becomes orthogonal to a drawing direction of said second raw glass substrate; and arranging said first rectangular substrate in an opposing relation to said second rectangular substrate with a gap formed therebetween to accept a liquid crystal layer and with the longer sides of said first and second rectangular substrates being in the same direction.

2. A fabrication method of a liquid crystal display device, as claimed in claim 1, wherein pixel electrodes, a common electrode and switching elements connected to respective ones of said pixel electrodes are formed on one of said first and second rectangular substrates and a color filter is formed on said the other substrate.

3. A fabrication method of a liquid crystal display device, as claimed in claim 1, wherein a plurality of said first rectangular substrates are cut apart from said first raw glass substrate in the step of cutting said first rectangular substrate and a plurality of said second rectangular substrates are cut apart from said second raw glass substrate in said cutting apart said second rectangular substrate, said method further comprising before said cutting said first and second rectangular substrates, forming electrodes and switching elements on each of said first rectangular substrates and forming a color filter layer on each of said second rectangular substrates.

4. A fabrication method of a liquid crystal display device, as claimed in claim 2, further comprising:

printing a seal material on said first rectangular substrate;

dispersing spacers on a surface of said second rectangular substrate;

adhering said first rectangular substrate to said second rectangular substrate by arranging said first and second rectangular substrates in an opposing relation with said seal material and said spacers being inside and hardening said seal material while applying a constant pressure between said first and second rectangular substrates; and injecting liquid crystal material into said gap between said first and second rectangular substrates.

5. A fabrication method of a liquid crystal display device, as claimed in claim 1, wherein said surface irregularity comprises a surface waviness.

6. A fabrication method of a liquid crystal display device, as claimed in claim 1, further comprising:

before said cutting said first and second rectangular substrates, forming electrodes and switching elements on said first rectangular substrate, and forming a color filter layer on said second rectangular substrate.

7. A fabrication method of a liquid crystal display device, as claimed in claim 1, wherein said first rectangular substrate comprises a thin-film transistor (TFT) substrate, and said second rectangular substrate comprises a color filter (CF) substrate.

8. A fabrication method of a liquid crystal display device, as claimed in claim 1, wherein said arranging said first rectangular substrate comprises arranging said surface irregularity of said first rectangular substrate orthogonally to said surface irregularity of said second rectangular substrate.

9. A fabrication method of a liquid crystal display device, as claimed in claim 1, wherein said liquid crystal display device comprises an in-plane switching (IPS) liquid crystal display device.

10. A fabrication method of a liquid crystal display device, as claimed in claim 1, further comprising:

forming a sealing material between said first and second rectangular substrates.

11. A fabrication method of a liquid crystal display device, as claimed in claim 10, further comprising:

hardening said sealing material by one of heating and irradiation with ultraviolet light, while applying a constant pressure between said first and second rectangular substrates.

12. A fabrication method of a liquid crystal display device, as claimed in claim 1, wherein said liquid crystal display device comprises one of an active matrix liquid crystal display device and a passive matrix liquid crystal display device.

13. A fabrication method of a liquid crystal display device, as claimed in claim 1, wherein said first raw glass substrate and said second raw glass substrate comprise a same substrate.

14. A fabrication method of a liquid crystal display device, comprising:

cutting apart a first rectangular substrate from a first raw glass substrate having a surface irregularity such that a longer side direction of said first rectangular substrate is coincident with a drawing direction of said first raw glass substrate;

cutting apart a second rectangular substrate from a second raw glass substrate having a surface irregularity such that a longer side direction of said second rectangular substrate becomes orthogonal to a drawing direction of said second raw glass substrate; and arranging said first rectangular substrate in an opposing relation to said second rectangular substrate with a gap formed therebetween to accept a liquid crystal layer and with the longer sides of said first and second rectangular substrates being in the same direction, wherein a plurality of said first rectangular substrates are cut apart from said first raw glass substrate in said cutting apart said first rectangular substrate and a plurality of said second rectangular substrates are cut apart from said second raw glass substrate in said cutting apart said second rectangular substrate.

15. A fabrication method of a liquid crystal display device, comprising:

forming a plurality of first rectangular substrates from a first raw glass substrate such that a longest side of said plurality of first rectangular substrates is coincident with a drawing direction of said first raw glass substrate;

forming a plurality of second rectangular substrates from a second raw glass substrate such that a longest side of said plurality of second rectangular substrates becomes orthogonal to a drawing direction of said second raw glass substrate; and arranging one of said plurality of first rectangular substrates in an opposing relation to one of said plurality of said second rectangular substrates, such that said longest side of said first rectangular substrate is arranged in a same direction as said longest side of said second rectangular substrate.

16. A fabrication method of a liquid crystal display device, as claimed in claim 15, further comprising:

before said forming said plurality of first rectangular substrates and said forming said plurality of second rectangular substrates, forming electrodes and switching elements on said first raw glass substrate, and forming a color filter layer on said second raw glass substrate.

* * * * *